L. WOLF.
WELDING TOOL.
APPLICATION FILED JUNE 14, 1909.
952,089.
Patented Mar. 15, 1910.
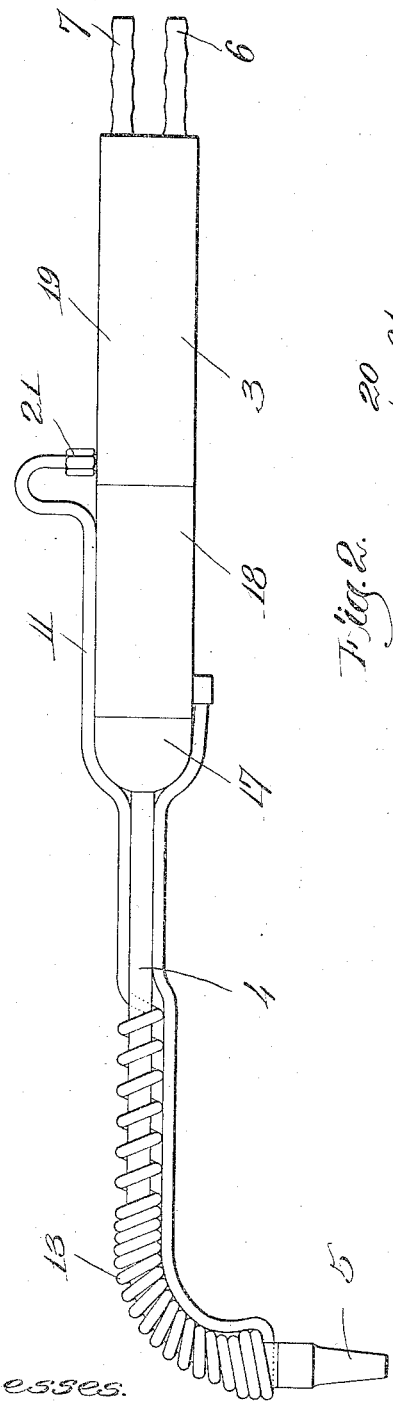
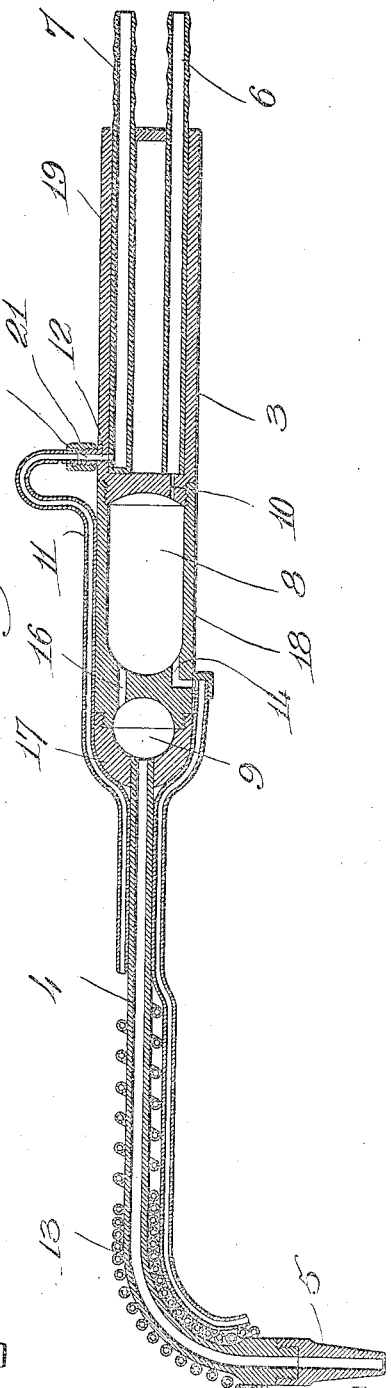

UNITED STATES PATENT OFFICE.

LINUS WOLF, OF BOSTON, MASSACHUSETTS.

WELDING-TOOL.

952,089.

Specification of Letters Patent. Patented Mar. 15, 1910.

Application filed June 14, 1909. Serial No. 501,918.

*To all whom it may concern:*

Be it known that I, LINUS WOLF, a subject of the Emperor of Germany, residing at Boston, county of Suffolk, and State of Massachusetts, have invented an Improvement in Welding-Tools, of which the following description, in connection with the accompanying drawing, is a specification, like numerals on the drawing representing like parts.

This invention relates to that class of welding tools which are adapted for autogenous welding, that is, welding which is accomplished by means of a flame produced by the mixture of oxygen and some other gas.

So far as I am aware all prior tools of this nature are designed to be used with a mixture of oxygen and a comparatively light gas, such as hydrogen, and such tools cannot be successfully used where the flame is produced by a mixture of oxygen with a heavier gas because the heavier gas does not mix as readily with the oxygen, and the tools as heretofore constructed are not adapted for securing the necessary intimate mixture between oxygen and heavy gas to produce a proper flame.

The object of my invention is to produce a novel tool of this character in which a heavy gas can be used in connection with oxygen for producing a flame of a high temperature, and I accomplish this end by a special arrangement of mixing chamber which results in a thorough and intimate mixture between the two gases used.

I will first describe one embodiment of my invention and then point out the novel features thereof in the appended claims.

In the drawings, Figure 1 is a side view of a tool embodying my invention; Fig. 2 is a longitudinal section thereof.

The tool comprises the body portion 3 which constitutes a handle by which it may be held, and a tubular neck 4 extending from the body portion and terminating in a nozzle 5 at the end of which the flame is produced. The oxygen is supplied to the device through a pipe 6 and the other gas is supplied through a pipe 7. The body 3 is formed on its interior with a primary mixing chamber 8 into which the oxygen and other gas are delivered separately, and in which they are partially mixed. From the mixing chamber 8 the partially-mixed gases are taken to a second mixing chamber 9 in which the mixing is completed, and from this chamber they are delivered to the interior bore of the neck 4, from which they pass to the nozzle 5.

The primary mixing chamber 8 is arranged so that the two different gases are delivered thereto at opposite sides, and in opposite directions, with the result that the two streams of gases meet each other in the mixing chamber and become broken up and quite thoroughly mixed. The second mixing chamber 9 is so arranged that as the partially-mixed gases are delivered thereto, they are given eddy currents, or a whirling motion, which completes the mixing.

The oxygen inlet pipe 6 communicates with a port 10 leading into one end of the primary mixing chamber 8. The pipe 7 communicates with a port 12 which leads to a pipe 11 situated on the exterior of the body, said pipe being formed into a coil 13 which encircles the neck 4 adjacent to the nozzle 5. This coil constitutes a heating coil in which the heavy gas is heated before it is introduced to the mixing chamber 8. The pipe 11 terminates at a port 14 which leads into the mixing chamber 8 at a point opposite to the port 10, and preferably the two ports 10 and 14 are so disposed that the two streams of gas issuing therefrom will meet each other in the mixing chamber 8. By means of this construction, the gases become quite thoroughly mixed in the chamber 8. The two mixing chambers 8 and 9 communicate with each other through a port 16.

In order to get a more thorough mixing in the chamber 9, I propose to make said chamber with curved walls, and preferably the chamber will be spherical in shape, and I also propose to place the inlet port 16 so that the stream of partially-mixed gases is delivered therefrom in a direction substantially tangential to the curved wall of the chamber 9. As the stream of gas enters said chamber 9 it is given a whirling motion, which operates to complete the mixing of the two gases.

The body 3 may be made in various ways in order to secure the two desired mixing chambers without departing from my invention. As one convenient and mechanical way, I have shown it as comprising the section 17 to which the stem 4 is secured and which is hollowed out to form a portion of the chamber 9, and which is also screw-threaded to another section 18 in which the chamber 8 and the ports 14 and 16 are formed. The body 3 also comprises a section 19, which supports the pipes 6 and 7 and which is screw-threaded to the section 18. The section 19 is shown as provided with the nipple 20 through which the port 12 extends, and the pipe 11 is connected to this nipple by means of an ordinary union 21. These details of construction, however, are not essential to the invention.

While my invention is of such a construction that it can be successfully used with any heavy gas mixed with oxygen, yet I have found that it works especially well when "liquid gas" such, for instance, as would be produced by the apparatus shown in my Patent No. 909,125, is mixed with oxygen.

Having fully described my invention, what I claim as new and desire to secure by Letters Patent is:—

1. In a welding tool, the combination with a body having a mixing chamber and provided with inlet ports on opposite sides thereof, of a burner nozzle supported by the body and communicating with the mixing chamber, a heating coil associated with the nozzle and communicating with one of said ports, and an inlet pipe communicating with the other of said ports.

2. In a welding tool, the combination with a body having a mixing chamber provided with two ports situated at opposite sides thereof and directed toward each other, said body having a second mixing chamber communicating with the first-named mixing chamber, of a burner nozzle supported by the body and communicating with the second mixing chamber, a heating coil associated with said nozzle and communicating with one of said ports, and an inlet pipe communicating with the other of said ports.

3. In a welding tool, the combination with a body having a primary mixing chamber provided with two separate ports at opposite sides thereof, said body also having a secondary mixing chamber provided with curved walls and a port connecting said chambers and arranged to deliver gas tangentially against the curved wall of the secondary mixing chamber, of a burner nozzle communicating with said secondary mixing chamber, and means to deliver two separate gases to the ports of the primary mixing chamber.

4. In a welding tool, the combination with a primary mixing chamber and means to introduce two separate gases thereto at opposite sides and in opposite directions, of a secondary spherical mixing chamber and means to deliver gas from the primary mixing chamber to the secondary mixing chamber in a direction substantially tangentially to the wall of the latter chamber, and a nozzle communicating with said latter chamber.

In testimony whereof, I have signed my name to this specification, in the presence of two subscribing witnesses.

LINUS WOLF.

Witnesses:
  Louis C. Smith,
  Frederick S. Greenleaf.